United States Patent
Liu (10) Patent No.: US 11,012,958 B2
(45) Date of Patent: May 18, 2021

(54) SIGNAL TRANSMISSION METHOD AND SIGNAL TRANSMISSION APPARATUS

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/679,130

(22) Filed: Nov. 8, 2019

(65) Prior Publication Data

US 2020/0077353 A1    Mar. 5, 2020

Related U.S. Application Data

(63) Continuation of application No. PCT/CN2017/088748, filed on Jun. 16, 2017.

(51) Int. Cl.
*H04W 56/00* (2009.01)
*H04W 72/00* (2009.01)
*H04W 72/04* (2009.01)

(52) U.S. Cl.
CPC ....... *H04W 56/001* (2013.01); *H04W 72/005* (2013.01); *H04W 72/0466* (2013.01)

(58) Field of Classification Search
CPC ... H04W 24/02; H04W 48/10; H04W 72/044; H04W 74/0833; H04W 76/10;
(Continued)

(56) References Cited

U.S. PATENT DOCUMENTS 10,505,689 B2 * 12/2019 Xiong ................... H04L 5/0053
2009/0161652 A1   6/2009 Chang et al.
(Continued)

FOREIGN PATENT DOCUMENTS

CN       105075354 A      11/2015
CN       106793058 A      5/2017
(Continued)

OTHER PUBLICATIONS

A. Chakrapani, "On the Design Details of SS/PBCH, Signal Generation and PRACH in 5G-NR," in IEEE Access, vol. 8, p. 136617-136637, 2020, doi: 10.1109/ACCESS.2020.3010500. (Year: 2020).*
(Continued)

*Primary Examiner* — Matthew C Sams
(74) *Attorney, Agent, or Firm* — Arch & Lake LLP (57) ABSTRACT

A signal transmission method, a signal transmission device and a computer-readable storage medium are provided. The method includes: determining user equipment; and transmitting beams of a 5th-Generation (5G) signal to the user equipment, where the 5G signal includes a plurality of Synchronization Signal Block (SSB) sets, at least one SSB set includes an even number of SSBs, the even number of SSBs include a plurality of groups of SSBs, each group of SSBs include two SSBs, and the plurality of groups of SSBs are transmitted in a plurality of time slots in radio frames of the 5G signal, with each group of SSBs being transmitted in one time slot; and the SSBs are used for carrying a Physical Broadcast Channel (PBCH), the PBCH carries first information, a scrambling code of the PBCH comprises second information, and the first information and the second information are used for determining time-domain information of the SSBs.

16 Claims, 6 Drawing Sheets

(58) Field of Classification Search
CPC ............ H04W 84/045; H04W 84/047; H04W 56/001; H04W 72/005; H04W 72/0466; H04L 1/0061; H04L 1/0067; H04L 1/00; H04L 1/0057; H04L 1/0071; H04L 1/0072; H04L 1/0606; H04L 2001/0093; H04L 5/0051; H04L 5/0053; H03M 13/09; H03M 13/13; H03M 13/27; H03M 13/635

See application file for complete search history.

(56) References Cited

U.S. PATENT DOCUMENTS

| | | | |
|---|---|---|---|
| 2014/0198772 A1 | 7/2014 | Baldemair et al. | |
| 2015/0245244 A1 | 8/2015 | Wentink | |
| 2018/0359783 A1* | 12/2018 | Abedini | H04W 76/10 |
| 2020/0059245 A1* | 2/2020 | Zhang | H03M 13/27 |
| 2020/0120634 A1* | 4/2020 | Lee | H04W 74/0833 |
| 2020/0154376 A1* | 5/2020 | Ko | H04W 76/11 |
| 2021/0007065 A1* | 1/2021 | Ko | H04L 5/0051 |

FOREIGN PATENT DOCUMENTS

| | | | | |
|---|---|---|---|---|
| CN | 110495112 A | * | 11/2019 | ............ H04J 11/00 |
| CN | 110521146 A | * | 11/2019 | ........... H04L 5/0051 |
| WO | WO-2019029666 A1 | * | 2/2019 | ........ H04W 72/0446 |

OTHER PUBLICATIONS

International Search Report and Written Opinion of PCT Application No. PCT/CN20171088748, dated Feb. 26, 2018, with English translation, (6p).
LG Electronics—3GPP TSG RAN WG1 Meeting #89 R1-1707589. Discussion on SS Block Time Index Indication, May 19, 2017, (3p).
NTT Docomo, INC.—3GPP TSG RAN meeting #76 RP-171137. New Radio(NR) Access Technology, Jun. 8, 2017, (218p).
Intel Corporation—3GPP TSG RAN WG1 Meeting RAN1 #89 R1-1707338. SS Block Time Index Indication, May 19, 2017, (4p).
Fujitsu—3GPP TSG RAN WG1 Meeting #89 R1-1707252. Consideration on SS Block Time Index Indication, May 19, 2017, (4p).
Huawei et al.—3GPP TSG RAN WG1 Meeting #89 R1-1708166. Discussion on SS Block Time Index Indication, May 19, 2017, (5p).

* cited by examiner

SIGNAL TRANSMISSION METHOD AND SIGNAL TRANSMISSION APPARATUS

CROSS-REFERENCE TO RELATED APPLICATION

This application is a U.S. continuation application of International Patent Application No. PCT/CN2017/088748, entitled "Signal transmission method and signal transmission apparatus," filed on Jun. 16, 2017, the disclosure of which is hereby incorporated by reference in its entirety for all purposes.

TECHNICAL FIELD

The present disclosure generally relates to the technical field of communication, and more particularly, to a signal transmission method and a signal transmission device.

BACKGROUND

At present, in a 3rd Generation Partnership Project (3GPP) 5th-Generation (5G) standardization process, a Synchronization Signal Block (SSB) is transmitted mainly in a beam scanning manner, and the SSB carries a synchronization signal and a Physical Broadcast Channel (PBCH).

Based on introduction of SSB, the concept of SSB sets is further introduced. For example, a transmission cycle of each SSB set is 20 milliseconds and a transmission cycle of a PBCH is 80 milliseconds, namely four transmission cycles of SSB sets may exist in the transmission cycle of the PBCH. Each transmission cycle of the SSB set further includes two 10-millisecond radio frames, and transmission of all SSBs is completed within a certain 5-millisecond time period of each radio frame, namely a radio frame may include two SSB transmission windows.

Therefore, to enable user equipment receiving SSBs to determine an absolute time position of each SSB, the absolute time position is usually determined according to resources in a PBCH in the SSB. However, the absolute time position specifically includes a time position of a transmission cycle of a SSB set in a transmission cycle of the PBCH, a time position of a radio frame in the transmission cycle of the SSB set and the like, and determination of these time positions requires relatively more resources of the PBCH that is originally low in capacity. As a result, other information may not be effectively transmitted through the PBCH.

SUMMARY

The present disclosure provides a method and a device for signal transmission, and a computer-readable storage medium.

According to a first aspect of the present disclosure, there is provided a method for signal transmission, including: determining user equipment; and transmitting beams of a 5G signal to the user equipment, where the 5G signal may include a plurality of SSB sets, at least one SSB set may include an even number of SSBs, the even number of SSBs may include a plurality of groups of SSBs, each group of SSBs may include two SSBs, and the plurality of groups of SSBs may be transmitted in a plurality of time slots in radio frames of the 5G signal, with each group of SSBs being transmitted in one time slot; and the SSBs may be used for carrying a PBCH, the PBCH may carry first information, a scrambling code of the PBCH may include second information, and the first information and the second information may be used for determining time-domain information of the SSBs.

According to a second aspect of the present disclosure, there is provided a device for signal transmission, including: a processor; and a memory configured to store an instruction executable for the processor. The processor may be configured to: determine user equipment; and transmit beams of a 5G signal to the user equipment. The 5G signal may include a plurality of SSB sets, at least one SSB set may include an even number of SSBs, the even number of SSBs may include a plurality of groups of SSBs, each group of SSBs may include two SSBs, and the plurality of groups of SSBs may be transmitted in a plurality of time slots in radio frames of the 5G signal, with each group of SSBs being transmitted in one time slot. The SSBs may be used for carrying a PBCH, the PBCH may carry first information, a scrambling code of the PBCH may include second information, and the first information and the second information may be used for determining time-domain information of the SSBs.

According to a third aspect of the present disclosure, there is provided a non-transitory computer-readable storage medium, in which a computer program may be stored, the program being executed by a processor to implement at least following steps: determining user equipment; and transmitting beams of a 5G signal to the user equipment. The 5G signal may include a plurality of SSB sets, at least one SSB set may include an even number of SSBs, the even number of SSBs may include a plurality of groups of SSBs, each group of SSBs may include two SSBs, and the plurality of groups of SSBs may be transmitted in a plurality of time slots in radio frames of the 5G signal, with each group of SSBs being transmitted in one time slot. The SSBs may be used for carrying a PBCH, the PBCH may carry first information, a scrambling code of the PBCH may include second information, and the first information and the second information may be used for determining time-domain information of the SSBs.

It is to be understood that the above general descriptions and detailed descriptions below are only exemplary and explanatory, and not intended to limit the present disclosure.

BRIEF DESCRIPTION OF THE DRAWINGS

In order to describe the technical solutions of the present disclosure more clearly, the accompanying drawings required to be used for descriptions about the examples will be simply introduced below. It is apparent that the accompanying drawings described below are only some examples of the present disclosure. Those of ordinary skill in the art may further obtain other accompanying drawings according to these accompanying drawings without creative work.

DETAILED DESCRIPTION

Examples of the present disclosure will be clearly and completely described below in combination with the accompanying drawings. It is apparent that the described examples are not all examples but only part of examples of the present disclosure. All other examples obtained by those of ordinary skill in the art based on the examples in the present disclosure without creative work shall fall within the scope of protection of the present disclosure.

Figure 1:
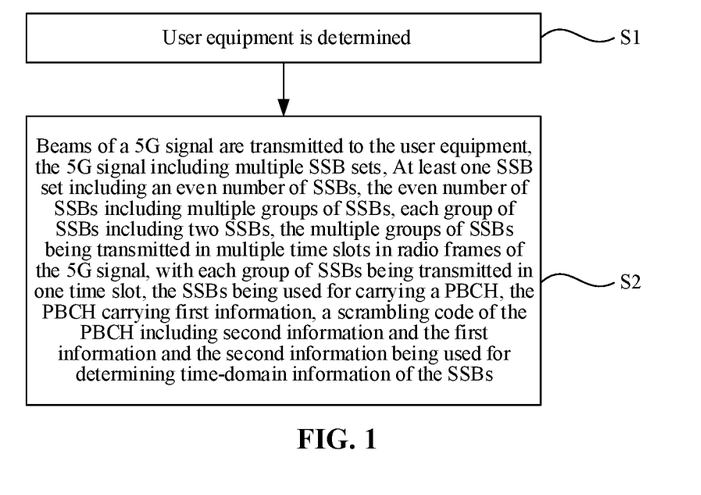
FIG. 1 is a schematic flow chart showing a method for signal transmission according to an exemplary aspect of the present disclosure.

FIG. 1 is a schematic flow chart showing a method for signal transmission according to an exemplary aspect of the present disclosure. The method may be applied to signal transmission equipment such as a base station. As shown in FIG. 1, the method includes the following steps.

In S1, user equipment is determined.

In S2, beams of a 5G signal are transmitted to the user equipment. Here, 5G signals uses wavelengths measured in millimeters, which are broadcast at frequencies between 30 and 300 gigahertz.

The 5G signal includes multiple SSB sets, at least one SSB set includes an even number of SSBs. In one example, each SSB set includes an even number of SSBs, the even number of SSBs include multiple groups of SSBs, each group of SSBs include two SSBs, and the multiple groups of SSBs are transmitted in multiple time slots (which may also be called slots) in radio frames of the 5G signal, with each group of SSBs being transmitted in one time slot; and the SSBs are used for carrying a PBCH, the PBCH carries first information, a scrambling code (which may be scrambled with pseudo-random sequences) of the PBCH includes second information, and the first information and the second information are used for determining time-domain information of the SSBs.

Figure 2:
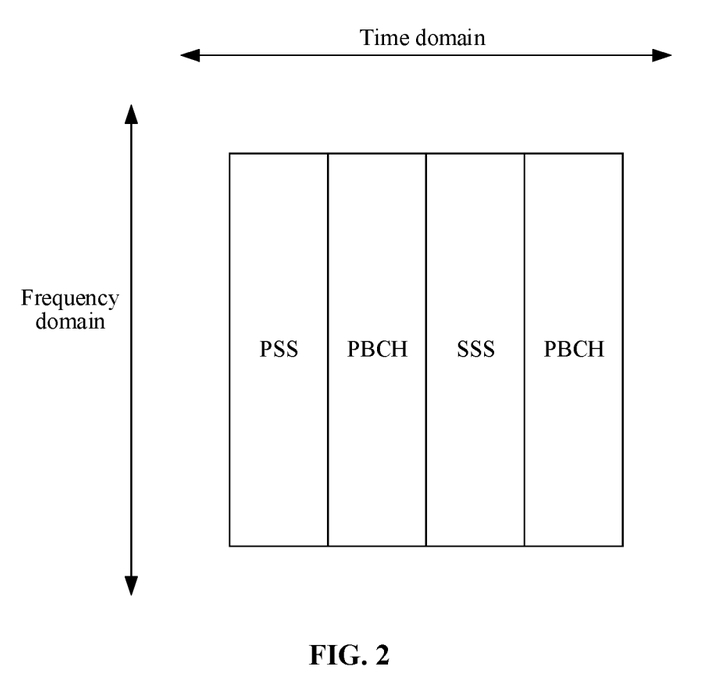
FIG. 2 is a schematic diagram illustrating a SSB according to an exemplary aspect.

FIG. 2 is a schematic diagram illustrating a SSB according to an exemplary aspect.

In an example, all SSBs in a transmission cycle of a PBCH are the same. As shown in FIG. 2, a SSB may not only carry a PBCH but also carry a Primary Synchronization Signal (PSS) and a Secondary Synchronization Signal (SSS), and may further carry a demodulation reference signal, and both the demodulation reference signal and the SSS may be taken as references of a demodulation result of the PBCH. Moreover, a time-domain relationship between the PSS and the SSS is not limited to the example shown in FIG. 2. For example, the PSS and the SSS may also be arranged adjacent to each other. There are no limits made thereto in the present disclosure.

In an example, a corresponding relationship among a frequency band, a subcarrier spacing, a time slot number in 5 milliseconds and a SSB number of a SSB set is shown in Table 1.

TABLE 1

| Frequency band | Subcarrier spacing | Time slot number in 5 milliseconds | Maximum SSB number |
|---|---|---|---|
| Above 3G | 15 kHz | 5 | 4 |
| Above 3G and below 6G | 30 kHz | 10 | 8 |
|  | 60 kHz | 20 |  |
| Above 6G | 120 kHz | 40 | 64 |
|  | 240 kHz | 40 |  |

As shown in Table 1, for example, in a case that the subcarrier spacing is 120kHz, there are 40 time slots in 5 milliseconds and the maximum SSB number is 64. Here, taking the SSB number being the maximum number, i.e. 64, as an example, since the SSB number is larger than the time slot number, the time slots in the 40 time slots and SSBs may form three corresponding relationships: some time slots do not correspond to any SSB, some time slots correspond to one SSB and some time slots correspond to two SSBs. As a result, the SSBs and the time slots may form three corresponding relationships, and thus, there are more than $2^6=64$ corresponding relationships between the 64 SSBs and the 40 time slots, namely resources for determining the corresponding relationship between the SSBs and the time slots are more than 6 bits, that is, at least 7 bit resources of the PBCH are required to be occupied to determine the corresponding relationship between the SSBs and the time slots.

According to an example of the present disclosure, every two SSBs of the even number of SSBs in the SSB set are grouped into a group, so that the 64 SSBs may be divided into 32 groups, and the two SSBs in s same group are transmitted in one time slot, namely the 32 groups of SSBs are transmitted through the 32 time slots of the 40 time slots. Since the 32 groups of SSBs are the same, only 40 circumstances are required to be determined for each group of SSBs. The time slot corresponding to each group of SSBs may be determined through 6 bit ($2^6>40$) resources, and for a SSB, only two circumstances about a sequence in a time slot exist, namely earlier or later. Therefore, the sequence of the SSB in the time slot may be determined through 1 bit ($2^1$).

The time slots corresponding to the SSBs may be determined through the first information, the sequences of the two SSBs in a corresponding time slot may be determined through the second information, and under this circumstance, only 6 bit resources of a physical broadcast system are required to be occupied. The time slots corresponding to the SSBs may also be determined through the second information, the sequences of the SSBs in the slot may be determined through the second information, and under this circumstance, only 1 bit resource of the physical broadcast system is required to be occupied. It can be seen that, under each circumstance, occupied PBCH resources may be reduced and other information may be conveniently carried in the PBCH.

Optionally, the first information is used for determining the time slots corresponding to the SSBs, and the second information is used for determining a sequence of the SSBs in the time slot.

According to the example shown in FIG. 1, when the time slots corresponding to the SSBs (i.e., the time slots corresponding to the SSB groups) are determined through the second information, 6 bit resources of the scrambling code of the PBCH are required to be occupied, and when relatively more resources of the scrambling code of the PBCH are required, the user equipment may spend relatively more time in a process for analyzing scrambling code, and thus a user experience is easily affected. Generally, the user experience is relatively good when the occupied resources of the scrambling code of the PBCH are less than or equal to 3 bits. Therefore, for ensuring the user experience, the time slots corresponding to the SSBs may be determined through the first information, and the sequences of the two SSBs in a corresponding time slot may be determined through the second information.

Optionally, a transmission cycle of the PBCH is a first cycle, the first cycle includes multiple second cycles for transmission of the SSB sets, each second cycle includes multiple radio frames that are the same, a preset time period in a radio frame in the second cycle is a third cycle for transmission of the SSBs;

the first information is further used for determining the radio frames where the SSBs are located and for determining the preset time periods where the SSBs are located in the radio frames; and the second information is further used for determining the second cycles where the SSBs are located in the first cycle.

Figure 3:
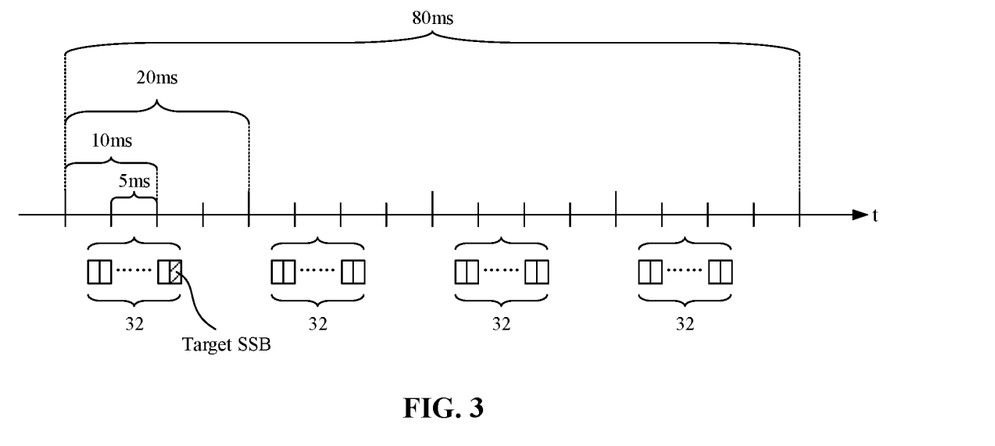
FIG. 3 is a schematic diagram illustrating a time domain where SSBs are located according to an exemplary aspect.

FIG. 3 is a schematic diagram illustrating a time domain where SSBs are located according to an exemplary aspect.

In an example, as shown in FIG. 3, the first cycle may be 80 milliseconds, the second cycle may be 20 milliseconds, and a radio frame may occupy 10 milliseconds. Based on the example shown in FIG. 1, the 64 SSBs are divided into 32 groups, and then the base station transmits the 32 groups of SSBs in a preset 5-millisecond time period of each second cycle. Since each SSB is the same, each SSB group is the same and each SSB set is the same. Therefore, in the four second cycles, the radio frames for the SSBs in each second cycle are the same, the preset time periods in each radio frame are the same, the corresponding time slots in each preset time period are the same, and the sequences in the SSB groups are the same.

The user equipment, when processing the PBCH, is required to integrate the PBCH in different SSBs, and the PBCH including the same information is easier to integrate, so that the user equipment may complete integrating the PBCH with lower time consumption and power consumption. It can be seen from the above discussion that, in the same first cycle, the radio frames where the SSBs are located, the preset time periods of the SSBs in the radio frames and the time slots corresponding to the SSBs are the same. Therefore, the first information may be set to determine the above information, namely the information is carried in the PBCH, to ensure that the PBCH is the same and further ensure that the user equipment may integrate the PBCH in different SSBs with lower time consumption and power consumption. The second cycles where the SSBs are located in the first cycle and the sequences of the two SSBs in the corresponding time slot may be determined through the second information.

For example, as shown in FIG. 3, a target SSB is located in a second cycle 1 in the first cycle (i.e., the first second cycle in the first cycle), in a first radio frame in the second cycle 1, in a second preset time period in the first radio frame, and in the 40th time slot in the 40 time slots in the second preset time period, and its sequence in the SSB group is later.

Then, the first information may be 01010100, here the first bit represents the radio frame where the SSB is located in the second cycle, 0 representing locating in the first radio frame, the second bit represents the preset time period where the SSB is located in the radio frame, 1 representing location in the second preset time period, and the last 6 bits represent the time slot corresponding to the SSB, 010100 representing the 40th time slot.

Correspondingly, the second information may be 001, here the first bit and the second bit represent the specific second cycle where the SSB is located in the first cycle, 00 representing locating in the second cycle 1, and the third bit represents the sequence of the SSB in the SSB group, 1 representing locating at the second position.

Then, the time-domain information of the target SSB may be determined according to the first information and the second information.

Optionally, the multiple time slots used for transmitting the plurality of SSB groups in a same radio frame are continuous.

In an example shown in FIG. 1, when SSB groups are randomly arranged in the 40 time slots, the first information is required to determine 40 circumstances. Since $40>30=2^5$, the time slot corresponding to each SSB group is required to be determined through 6 bits. The multiple time slots transmitting the plurality of SSB groups are set to be continuous, namely the 32 groups of SSBs correspond to 32 continuous time slots, and then, under the circumstance that a starting point of the 32 continuous time slots is known in advance, there are only 32 corresponding relationships between each group of SSBs and the 32 time slots, namely only 32 circumstances are required to be determined for each group of SSBs, so that only 5 bits ($2^5$=32) resources are required to be occupied. Compared with random arrangement of the SSBs, such a manner has the advantage that the occupied PBCH resources may further be reduced.

Optionally, the 5G signal further includes remaining essential system information (RMSI), and the RMSI includes the number of the beams.

In an example, after the base station transmits the beams of the 5G signal to the user equipment, the user equipment is required to report a received beam number and a sequence number of each beam to the base station. However, in the stage that the user equipment processes the PBCH signal, the user equipment is not required to determine the received beam number and the sequence number of each beam, and the PBCH is also not required to report such data. Therefore, such data may be arranged in the RMSI outside the PBCH, and the user equipment, after completing processing the signal in the PBCH, may process the RMSI to obtain by analysis the received beam number and the sequence number of each beam for reporting to the base station.

Then, no PBCH resource is required to be occupied to determine the transmitted beam number and the sequence number of each beam, so that the occupied PBCH resources may further be reduced.

Optionally, the time slot includes 14 symbols. It is to be noted that a time slot may preferably be set to include 14 symbols but the number of the symbols in the time slot may also be regulated according to a requirement.

Corresponding to the example of the method for signal transmission, the present disclosure also provides an example of a device for signal transmission.

Figure 4:
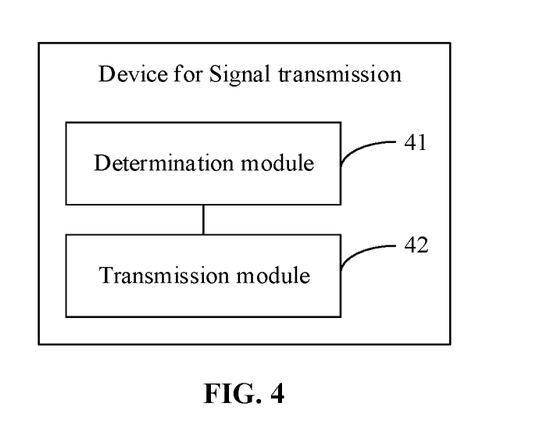
FIG. 4 is a schematic block diagram of a device for signal transmission according to an exemplary aspect.

FIG. 4 is a schematic block diagram of a device for signal transmission according to an exemplary aspect. The device may be applied to signal transmission equipment such as a base station, and as shown in FIG. 4, includes:
 a determination module 41, configured to determine user equipment; and
 a transmission module 42, configured to transmit beams of a 5G signal to the user equipment,
 wherein the 5G signal includes multiple SSB sets, each SSB set includes an even number of SSBs, the even number of SSBs include multiple groups of SSBs, each group of SSBs include two SSBs, and the multiple groups of SSBs are transmitted in multiple time slots in radio frames of the 5G signal, with each group of SSBs being transmitted in one time slot; and
 the SSBs are used for carrying a PBCH, the PBCH carries first information, a scrambling code of the PBCH includes second information, and the first information and the second information are used for determining time-domain positions of the SSBs to determine time-domain information of the SSBs.

Optionally, the first information is used for determining the time slots corresponding to the SSBs, and the second information is used for determining a sequence of the two SSBs in a corresponding time slot.

Optionally, a transmission cycle of the PBCH is a first cycle, the first cycle includes multiple second cycles for transmission of the SSB sets, each second cycle includes multiple radio frames that are the same, a preset time period in a radio frame in the second cycle is a third cycle for transmission of the SSBs;

the first information is further used for determining the radio frames where the SSBs are located and for determining the preset time periods where the SSBs are located in the radio frames; and the second information is further used for determining the second cycles where the SSBs are located in the first cycle and the sequences in a time slot.

Optionally, the multiple time slots used for transmitting the plurality of SSB groups in a same radio frame are continuous.

Optionally, the 5G signal further includes RMSI, and the RMSI includes the number of the beams.

Optionally, the time slot includes 14 symbols.

The device implementations substantially correspond to the method implementations, and thus related parts of the device may refer to part of the descriptions of the method. The examples of the device described above are only schematic; modules described as separate parts therein may or may not be physically separated; and parts displayed as modules may or may not be physical modules, namely may be located in the same place or may also be distributed in multiple network modules. Part or all of the modules therein may be selected according to a practical requirement to achieve the purpose of the disclosed examples. Those of ordinary skill in the art may understand and implement without creative work.

Correspondingly, the present disclosure also provides a device for signal transmission, which includes: a processor; and a memory configured to store an instruction executable for the processor, herein the processor is configured to determine user equipment and transmit beams of a 5G signal to the user equipment, herein the 5G signal includes multiple SSB sets, each SSB set includes an even number of SSBs, the even number of SSBs include multiple groups of SSBs, each group of SSBs include two SSBs, and the multiple groups of SSBs are transmitted in multiple time slots in radio frames of the 5G signal, with each group of SSBs being transmitted in one time slot; and the SSBs are used for carrying a PBCH, the PBCH carries first information, a scrambling code of the PBCH includes second information, and the first information and the second information are used for determining time-domain positions of the SSBs to determine time-domain information of the SSBs.

Correspondingly, the present disclosure also provides a terminal, which includes a memory and one or more programs, herein the one or more programs are stored in the memory and configured to be executed by one or more processors, and the one or more programs include instructions configured to execute the following operations: user equipment is determined; and beams of a 5G signal are transmitted to the user equipment, herein the 5G signal includes multiple SSB sets, each SSB set includes an even number of SSBs, the even number of SSBs include multiple groups of SSBs, each group of SSBs include two SSBs, and the multiple groups of SSBs are transmitted in multiple time slots in radio frames of the 5G signal, with each group of SSBs being transmitted in one time slot; and the SSBs are used for carrying a PBCH, the PBCH carries first information, a scrambling code of the PBCH includes second information, and the first information and the second information are used for determining time-domain positions of the SSBs to determine time-domain information of the SSBs.

Figure 5:
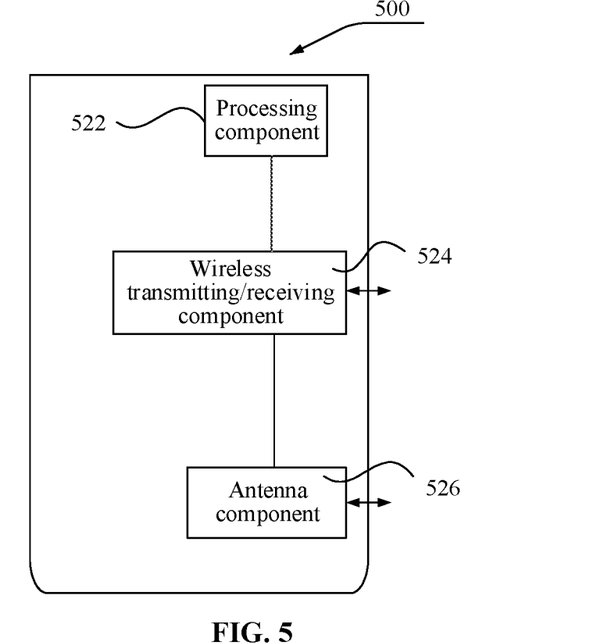
FIG. 5 is a structure diagram of a device for signal transmission according to an exemplary aspect.

As shown in FIG. 5, FIG. 5 is a structure diagram of a device 500 for signal transmission according to an exemplary aspect. The device 500 may be provided as a base station. Referring to FIG. 5, the device 500 includes a processing component 522, a wireless transmitting/receiving component 524, an antenna component 526 and a wireless interface-specific signal processing part, and the processing component 522 may further include one or more processors.

One processor in the processing component 522 may be configured to determine user equipment and transmit beams of a 5G signal to the user equipment, herein the 5G signal includes multiple SSB sets, each SSB set includes an even number of SSBs, the even number of SSBs include multiple groups of SSBs, each group of SSBs include two SSBs, and the multiple groups of SSBs are transmitted in multiple time slots in radio frames of the 5G signal, with each group of SSBs being transmitted in one time slot; and the SSBs are used for carrying a PBCH, the PBCH carries first information, a scrambling code of the PBCH includes second information, and the first information and the second information are used for determining time-domain information of the SSBs.

Figure 6:
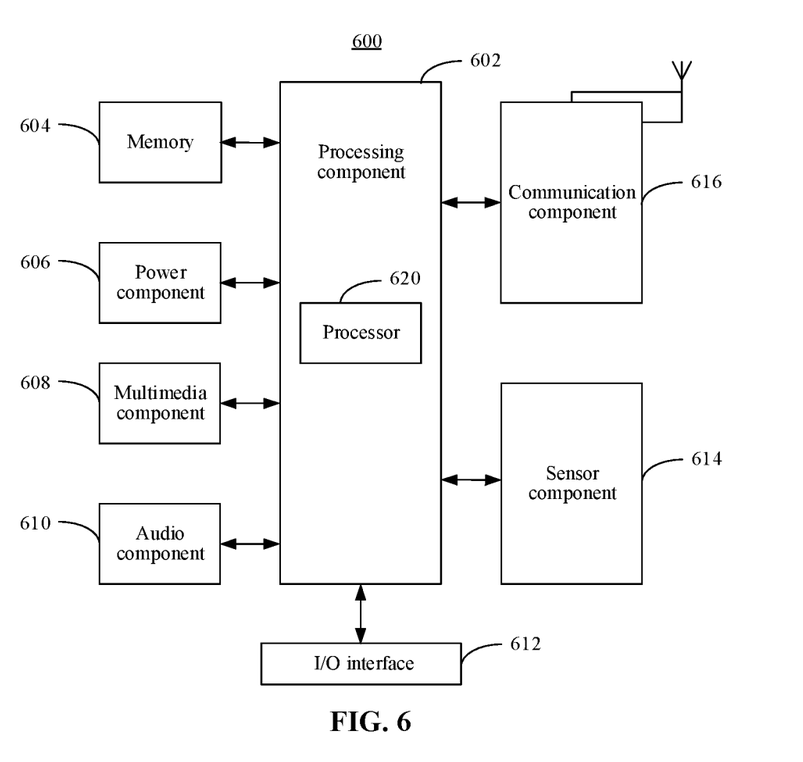
FIG. 6 is another structure diagram of a device for signal transmission according to an exemplary aspect.

FIG. 6 is another structure diagram of a device 600 for signal transmission according to an exemplary aspect. For example, the device 600 may be a mobile phone, a computer, a digital broadcast terminal, a messaging device, a gaming console, a tablet, a medical device, exercise equipment, a personal digital assistant and the like.

Referring to FIG. 6, the device 600 may include one or more of the following components: a processing component 602, a memory 604, a power component 606, a multimedia component 608, an audio component 610, an Input/Output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the abovementioned method. Moreover, the processing component 602 may include one or more modules which facilitate interaction between the processing component 602 and the other components. For instance, the processing component 602 may include a multimedia module to facilitate interaction between the multimedia component 608 and the processing component 602.

The memory 604 is configured to store various types of data to support the operation of the device 600. Examples of such data include instructions for any application programs or methods operated on the device 600, contact data, phonebook data, messages, pictures, video, etc. The memory 604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 606 provides power for various components of the device 600. The power component 606 may include a power management system, one or more power supplies, and other components associated with generation, management and distribution of power for the device 600.

The multimedia component 608 includes a screen providing an output interface between the device 600 and a user. In some examples, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 608 includes a front camera and/or a rear camera. The front camera and/or the rear camera may receive external multimedia data when the device 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a Microphone (MIC), and the MIC is configured to receive an external audio signal when the device 600 is in the operation mode, such as a call mode, a recording mode and a voice recognition mode. The received audio signal may further be stored in the memory 604 or sent through the communication component 616. In some examples, the audio component 610 further includes a speaker configured to output the audio signal.

The I/O interface 612 provides an interface between the processing component 602 and a peripheral interface module, and the peripheral interface module may be a keyboard, a click wheel, a button and the like. The buttons may include, but not limited to: a home button, a volume button, a starting button and a locking button.

The sensor component 614 includes one or more sensors configured to provide status assessment in various aspects for the device 600. For instance, the sensor component 614 may detect an on/off status of the device 600 and relative positioning of components, such as a display and small keyboard of the device 600, and the sensor component 614 may further detect a change in a position of the device 600 or a component of the device 600, presence or absence of contact between the user and the device 600, orientation or acceleration/deceleration of the device 600 and a change in temperature of the device 600. The sensor component 614 may include a proximity sensor configured to detect presence of an object nearby without any physical contact. The sensor component 614 may also include a light sensor, such as a Complementary Metal Oxide Semiconductor (CMOS) or Charge Coupled Device (CCD) image sensor, configured for use in an imaging application. In some examples, the sensor component 614 may also include an acceleration sensor, a gyroscope sensor, a magnetic sensor, a pressure sensor or a temperature sensor.

The communication component 616 is configured to facilitate wired or wireless communication between the device 600 and other equipment. The device 600 may access a communication-standard-based wireless network, such as a Wireless Fidelity (WiFi) network, a 2nd-Generation (2G) or 3rd-Generation (3G) network or a combination thereof In an example, the communication component 616 receives a PBCH or broadcast associated information from an external broadcast management system through a broadcast channel. In an example, the communication component 616 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an example, the device 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned method.

In an example, there is also provided a non-transitory computer-readable storage medium including an instruction, such as the memory 604 including an instruction, and the instruction may be executed by the processor 620 of the device 600 to implement the following steps: determining user equipment; and transmitting beams of a 5G signal to the user equipment, where the 5G signal may include a plurality of SSB sets, each SSB set may include an even number of SSBs, the even number of SSBs may include a plurality of groups of SSBs, each group of SSBs may include two SSBs, and the plurality of groups of SSBs may be transmitted in a plurality of time slots in radio frames of the 5G signal, with each group of SSBs being transmitted in one time slot; and the SSBs may be used for carrying a PBCH, the PBCH may carry first information, a scrambling code of the PBCH may include second information, and the first information and the second information may be used for determining time-domain information of the SSBs. For example, the non-transitory computer-readable storage medium may be a ROM, a Random Access Memory (RAM), a Compact Disc Read-Only Memory (CD-ROM), a magnetic tape, a floppy disc, an optical data storage device and the like.

The terminology used in the present disclosure is for the purpose of describing particular examples only and is not intended to limit the present disclosure. As used in this disclosure, the singular forms "a", "an", and "the" are intended to include the plural forms as well, unless the context clearly indicates otherwise. It should also be understood that the term "and/or" as used herein refers to and includes any and all possible combinations of one or more of the associated listed items.

It is to be noted that relational terms "first", "second" and the like in the present disclosure are adopted only to distinguish one entity or operation from another entity or operation but are not always to require or imply existence of any such practical relationship or sequence between the entities or operations. Terms "include", "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

The method and device provided in the examples of the present disclosure are introduced above in detail. The principle and implementation modes of the present disclosure are elaborated in the specification with specific examples. The examples are described above only to help the method of the present disclosure and the core concept thereof to be understood. In addition, those of ordinary skill in the art may make variations to the specific implementation modes and the scope of disclosure according to the concept of the present disclosure. To sum up, the contents of the specification should not be understood as limits to the present disclosure.

What is claimed is:

1. A method for signal transmission, comprising:
   determining, by a base station, a user equipment;
   transmitting, by the base station, beams of a 5th-Generation (5G) signal to the user equipment, wherein the 5G signal comprises Remaining essential System Information (RMSI), and wherein the RMSI comprises a number of the beams causing the user equipment to obtain the number of the beams based on the RMSI and report, to the base station, the number of the beams received by the user equipment, wherein the 5G signal comprises a plurality of Synchronization Signal Block (SSB) sets, at least one SSB set comprises an even number of SSBs, the even number of SSBs comprise a plurality of groups of SSBs, each group of SSBs comprise two SSBs, wherein a sequence of each SSB of each group of SSBs in one time slot is determined by using 1 bit, wherein the SSBs are used for carrying a Physical Broadcast Channel (PBCH); and
   transmitting, by the base station to the user equipment, the plurality of groups of SSBs in a plurality of time slots in radio frames of the 5G signal, with each group of SSBs being transmitted in one time slot causing the user equipment to determine time-domain information of the SSBs based on first information carried in the PBCH which comprises information relating to the SSBs location in a radio frame and second information carried in a scrambling code of the PBCH which comprises information associating with the SSBs location in a first cycle.

2. The method of claim 1, wherein the first information is used for determining the time slots corresponding to the plurality of groups of SSBs, and the second information is used for determining a sequence of the two SSBs in a corresponding time slot.

3. The method of claim 2, wherein a transmission cycle of the PBCH is the first cycle, the first cycle comprises a plurality of second cycles for transmission of the SSB sets, each second cycle comprises a plurality of radio frames that are the same, a preset time period in a radio frame in the second cycle is a third cycle for transmission of the SSBs;
   the first information is further used for determining the radio frames where the SSBs are located and for determining the preset time periods where the SSBs are located in the radio frames; and
   the second information is further used for determining the second cycles where the SSBs are located in the first cycle.

4. The method of claim 1, wherein the plurality of the time slots used for transmitting the plurality of SSB groups in a same radio frame are continuous.

5. The method of claim 1, wherein the time slot comprises 14 symbols.

6. The method of claim 2, wherein the plurality of the time slots used for transmitting the plurality of SSB groups in a same radio frame are continuous.

7. The method of claim 2, wherein the time slot comprises 14 symbols.

8. A system for signal transmission, comprising a base station and a user equipment, comprising:
   a processor; and
   a memory configured to store an instruction executable for the processor,
   wherein the processor is configured to:
   determine the user equipment;
   transmit beams of a 5th-Generation (5G) signal to the user equipment, wherein the 5G signal comprises Remaining essential System Information (RMSI), and wherein the RMSI comprises a number of the beams causing the user equipment to obtain the number of the beams based on the RMSI and report, to the base station, the number of the beams received by the user equipment, wherein the 5G signal comprises a plurality of Synchronization Signal Block (SSB) sets, at least one SSB set comprises an even number of SSBs, the even number of SSBs comprise a plurality of groups of SSBs, each group of SSBs comprise two SSBs, wherein a sequence of each SSB of each group of SSBs in one time slot is determined by using 1 bit, wherein the SSBs are used for carrying a Physical Broadcast Channel (PBCH); and
   transmit, to the user equipment, the plurality of groups of SSBs in a plurality of time slots in radio frames of the 5G signal, with each group of SSBs being transmitted in one time slot causing the user equipment to determine time-domain information of the SSBs based on first information carried in the PBCH which comprises information relating to the SSBs location in a radio frame and second information carried in a scrambling code of the PBCH which comprises information associating with the SSBs location in a first cycle.

9. The device of claim 8, wherein the first information is used for determining the time slots corresponding to the plurality of groups of SSBs, and the second information is used for determining a sequence of the two SSBs in a corresponding time slot.

10. The device of claim 9, wherein a transmission cycle of the PBCH is the first cycle, the first cycle comprises a plurality of second cycles for transmission of the SSB sets, each second cycle comprises a plurality of radio frames that are the same, a preset time period in a radio frame in the second cycle is a third cycle for transmission of the SSBs;
   the first information is further used for determining the radio frames where the SSBs are located and for determining the preset time periods where the SSBs are located in the radio frames; and
   the second information is further used for determining the second cycles where the SSBs are located in the first cycle.

11. The device of claim 8, wherein the plurality of the time slots used for transmitting the plurality of SSB groups in a same radio frame are continuous.

12. The device of claim 8, wherein the time slot comprises 14 symbols.

13. The device of claim 9, wherein the plurality of the time slots used for transmitting the plurality of SSB groups in a same radio frame are continuous.

14. The device of claim 9, wherein the time slot comprises 14 symbols.

15. A non-transitory computer-readable storage medium having stored a computer program that when being executed by a processor, implements the following steps:
   determining a user equipment;
   transmitting beams of a 5th-Generation (5G) signal to the user equipment, wherein the 5G signal comprises Remaining essential System Information (RMSI), and wherein the RMSI comprises a number of the beams causing the user equipment to obtain the number of the beams based on the RMSI and report, to the base station, the number of the beams received by the user equipment, wherein the 5G signal comprises a plurality of Synchronization Signal Block (SSB) sets, at least one SSB set comprises an even number of SSBs, the even number of SSBs comprise a plurality of groups of SSBs, each group of SSBs comprise two SSBs, wherein a sequence of each SSB of each group of SSBs in one time slot is determined by using 1 bit, wherein the SSBs are used for carrying a Physical Broadcast Channel (PBCH); and transmitting, to the user equipment, the plurality of groups of SSBs in a plurality of time slots in radio frames of the 5G signal, with each group of SSBs being transmitted in one time slot causing the user equipment to determine time-domain information of the SSBs based on first information carried in the PBCH which comprises information relating to the SSBs location in a radio frame and second information carried in a scrambling code of the PBCH which comprises information associating with the SSBs location in a first cycle.

16. The non-transitory computer-readable storage medium of claim 15, wherein the first information is used for determining the time slots corresponding to the plurality of groups of SSBs, and the second information is used for determining a sequence of the two SSBs in a corresponding time slot.

* * * * *